United States Patent
Fries

[11] 3,882,335
[45] May 6, 1975

[54] COOLING APPARATUS FOR THE ROTOR OF AN ELECTRIC MACHINE WHICH USES A HEAT PIPE

[75] Inventor: Paul Fries, Erlangen, Germany

[73] Assignee: Siemens Aktiengesellschaft, Munich, Germany

[22] Filed: Apr. 18, 1973

[21] Appl. No.: 352,270

[30] Foreign Application Priority Data
Apr. 25, 1972 Germany............................ 2220266

[52] U.S. Cl. ...................... 310/61; 310/62; 165/86; 165/105
[51] Int. Cl. ........................................... H02k 1/32
[58] Field of Search ............ 310/52, 54, 62, 63, 61, 310/64, 65, 58, 59, 53; 165/105, 86; 416/179, 186, 193; 230/122

[56] References Cited
UNITED STATES PATENTS

| 727,686 | 5/1903 | Priest | 310/62 |
|---|---|---|---|
| 1,877,904 | 9/1932 | Laffoon | 310/63 |
| 2,743,384 | 4/1956 | Turner | 310/54 |
| 2,772,854 | 12/1956 | Anxionnaz | 416/193 |
| 3,213,797 | 10/1965 | McMahan | 310/52 |
| 3,274,410 | 9/1966 | Boivie | 310/62 |
| 3,307,775 | 8/1965 | Petrie | 230/122 |
| 3,441,757 | 4/1969 | Erickson | 310/62 |
| 3,449,605 | 6/1969 | Wilson | 310/62 |
| 3,612,718 | 10/1971 | Palfreyman | 416/193 |

FOREIGN PATENTS OR APPLICATIONS
2,027,766 2/1970 France............................... 310/54

Primary Examiner—R. Skudy
Attorney, Agent, or Firm—Kenyon & Kenyon Reilly Carr & Chapin

[57] ABSTRACT

An improved cooling apparatus for the rotor of an electric motor in which a hollow center portion of the rotor has placed within it working fluid to cause the rotor to act as a heat pipe. The improvement comprises a fan placed over the end of the rotor shaft. The fan has a hollow portion in its hub which acts as an extension of the heat pipe thereby allowing the cooling vanes of the fan and the hub, which forms a part of inner heat pipe surface, to be made of one piece thereby allowing a more efficient heat transfer from the heat pipe to the cooling vanes.

3 Claims, 3 Drawing Figures

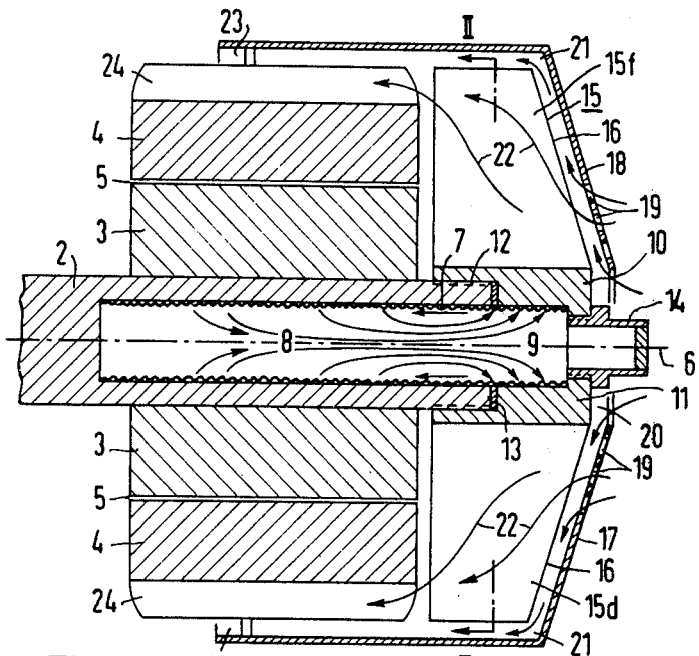
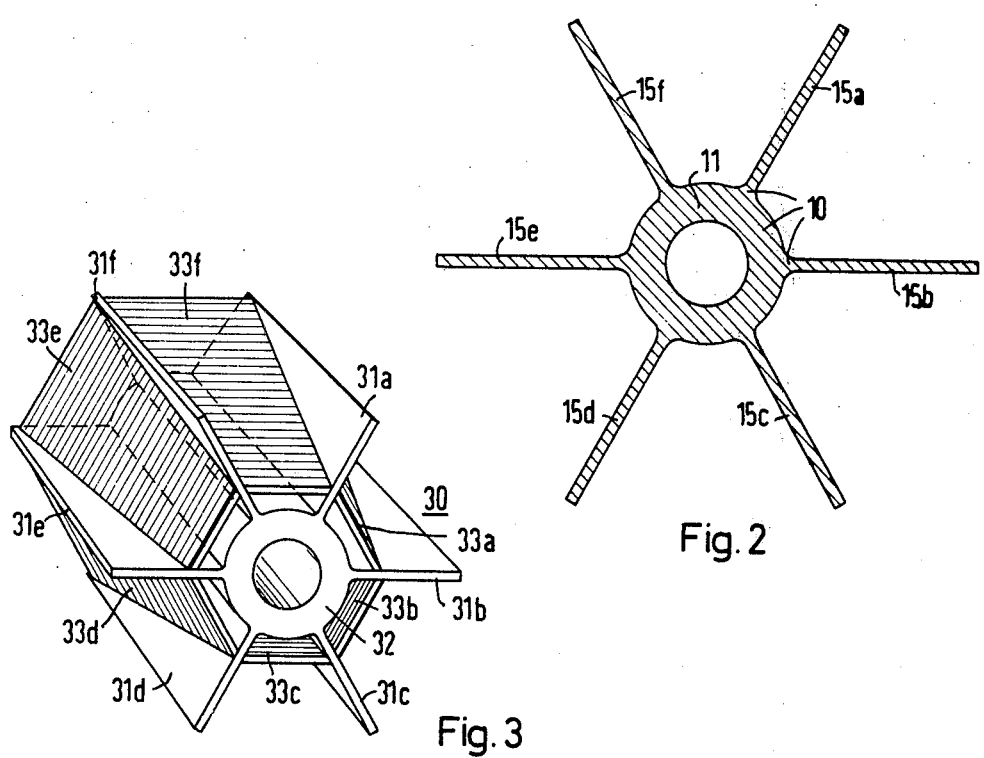

COOLING APPARATUS FOR THE ROTOR OF AN ELECTRIC MACHINE WHICH USES A HEAT PIPE

BACKGROUND OF THE INVENTION

This invention relates to electric machines in general and more particularly to improve apparatus for cooling of such machines.

It has been found that the rotor of an AC or DC electrical machine, i.e., a motor or generator, may be effectively cooled by designing its rotor shaft to act as a heat pipe. Such designs in which the rotor shaft is hollow and has a small amount of working fluid placed within it are disclosed in U.S. Pat. No. 2,743,384 and German Offenlegungsschrift 1,900,411. In such arrangements, the working fluid, for example water or alcohol, within the hollow rotor shaft is heated by heat transferred from the rotor and caused to evaporate. The evaporated fluid then flows toward the outside of the rotor shaft to a condensing section where there is installed cooling means. The fluid is then condensed and flows back along the walls of the hollow rotor to again be evaporated. Such heat pipe action is well known in the art and provides a very efficient means of heat transfer greatly exceeding that available with solid heat transfer means. Condensing sections may be installed at either or both ends of the rotor shaft as the particular design demands.

In one particular arrangement which is shown in German Offenlegungsschrift 1, 928, 358, the hollow shaft is made either entirely, or at least at its evaporator section, of a material which has good heat conductivity, e.g., copper. Copper, for example has a resistivity which is an order of magnitude smaller than that of steel which is normally used for manufacturing the hollow shaft. Thus, by using a highly conductive material the heat transfer from the condensation section of the hollow shaft to the outside environment can be materially improved. To furthur improve heat transfer to the environment German Offenlegungsschrift 1,928,358 discloses attaching a fan to the hollow shaft in the condensation section. Such a fan, which will comprise a plurality of vanes mounted to a hub, is also preferably made of a highly heat conductive material. The hub of this prior art fan has an opening of a diameter such that it will tightly fit over the end of the shaft to permit heat to be transferred from the condensation portion through the fan and to the environment. Generally, the fan will be cooled by air although other cooling mediums are possible.

In this type of arrangement, excellent cooling results may be obtained as long as there are no size limits on the fan. However, if compact design requires a small fan, problems may arise. Even though the hub is tightly fitted onto the end of the shaft, there will still remain a small air barrier between the two which will impede the flow of heat from the shaft to the hub. Large electrical machines are commonly equipped with a mechanical fan attached to their shaft. Such fans are normally made of steel and are used to provide a flow of air to cooling fins on the machine. Although, initially it might appear that such fans may be attached to a shaft designed as a heat pipe and serve the dual purpose of both removing heat from the condensation section of the heat pipe and providing cooling air to the cooling fins on the machine, this solution is not practical. The main problem involved is that this type of fan does not have the high heat conductivity which is needed in order to effectively remove heat from the heat pipe.

Thus, it can be seen that there is a need for an improved arrangement which may be used with a rotor constructed as a heat pipe which will be compact and which will efficiently remove heat generated within the rotors. Ideally, such a device should also be capable of providing cooling to the cooling fins of the machine to avoid duplication of parts.

SUMMARY OF THE INVENTION

The present invention provides a fan which efficiently and effectively serves all the above purposes. It provides very effective cooling of the heat pipe shaft in the rotor, and in addition provides cooling air to the cooling fins on the outside of the machine. The invention resides primarily in forming the fan with a hollow portion in its hub which becomes an extension of the heat pipe in the rotor shaft. The portion of the heat pipe within the fan hub becomes the primary portion of the condensing section and heat is conducted directly to the vanes of the fan without having to pass through any air gap.

To provide protection for operating personnel and to direct the air flow obtained by rotation of the vane, which rotates with the rotor shaft, a hood is used to enclose the fan. This hood is fastened around the end bell of the machine. To avoid problems of stagnation of air within the ventilator hood, one of two alternate embodiments are used. In the first, the vanes are made with slopping edges and the hood similarly shaped to prevent having a sharp corner where stagnant air may form. If the full rectangular vane area available is required, trapezoidal, diametrically opposed guide baffles are inserted between at least two pairs of vanes to assure that the air stream is effectively directed out of the hood toward the cooling fins of the electric machine.

BRIEF DESCRIPTION OF THE DRAWINGS

FIG. 1 is a cross-sectional view of an electric machine having the fan of the present invention installed.

FIG. 2 is a cross-sectional view of the fan of FIG. 1.

FIG. 3 is a perspective view of a second embodiment of the fan showing the trapezoidal guide baffles installed between pairs of the vanes.

DETAILED DESCRIPTION OF THE PREFERRED EMBODIMENT

A cross-sectional view of a first embodiment of the present invention installed in an electric machine is shown on FIG. 1. The rotor of the machine 3 is mounted to a shaft 2 which is supported for rotation in conventional manner. The rotor 3 rotates within the stator 4 with a small air gap 5 between the rotor and the stator. As shown, one end of the rotor shaft 2 is hollowed out to be used as a heat pipe. The fan 10 of the present invention includes a hub 11 which has a section of larger inside diameter, sized to fit over the shaft 2 and a section of smaller inside diameter which is substantially equal to the inside diameter of the hollowed portion of rotor 2, to act as an extension of the heat pipe formed thereby. The larger diameter section will preferably be threaded so that it may be screwed on to matching threads 12 on the end of the shaft 2. A sealing ring 13, which may, for example, be made of a plastic material, is placed between the rotor shaft 2 and the fan 10 to form a vacuum tight seal. The outside end of the fan 10 contains a plug 14 which permits adding the working fluid to the rotor shaft under a vacuum. The fan 10 is formed in a single piece of a highly conductive material and is made up of the hub portion 11 and a plurality of vanes 15A through 15F [In this particular embodiment six vanes are shown. However, the number of vanes may be varied as required.] This fan construction may be more clearly seen from an observation of FIG. 2 which shows a cross-section of the fan along the lines II—II.

Prior to operation, the plug 14 is removed and a small amount of working fluid, which will normally be less than 10% of the interior space is added under a vacuum. The plug is then installed causing the working fluid to be sealed within the heat pipe under a vacuum. In operation, as the rotor spins, the working fluid will form a film 7 on the walls of the hollow portion. The heat pipe may be thought of as generally having an evaporation section 8 and a condensation section 9. Heat from the rotor 3 will be transferred through the walls of the shaft 2 and will heat the working fluid causing it to evaporate, thus removing heat from the rotor. The evaporated working fluid will flow in the direction of the arrows to the condensation section 9 which will be at a lower pressure. Here, heat will be transferred from the evaporated fluid to the fan 10 causing condensation. The condensed fluid will then flow back along the inside walls to repeat the evaporation-condensation cycle. Because the hub 11 of the fan forms the major portion of the condensation section of the heat pipe, and because the hub 11 is made in a single piece with the vanes 15A through 15F, very effective heat transfer takes place. In the embodiment of FIGS. 1 and 2, the vanes 15A through 15F have outside edges which slope upwardly toward the machine. The ventilator is surrounded by a fan hood 17 which is shaped to conform with the shape of the vanes. Hood 17 is attached to the outside case of the stator in conventional fashion. The end of the hood 17 contains an entrance opening 20 and has a portion adjacent thereto which is provided with a protective grill formed by making a plurality of holes 19 in the hood 17 in the area surrounding entrance opening 20. The hood provides the dual function of providing protection i.e., both of providing protection for operating personnel and of protecting the ventilator from any foreign objects coming in contact with it as it rotates, and of providing a guiding surface for air flowing through the ventilator. As can be seen from FIG. 1, the hood 17 extends back over a portion of the stator. Air is drawn in through the entrance opening 20 and the grilled portion formed by the holes 19. The shape of the vanes and of the hood causes this air to be directed over the outside of the stator 4 which will contain a plurality of cooling fins 24. Thus, the fan is serving to both cool the rotor and to help in cooling the stator. The slopping shape of the vanes assures that air cannot stagnate within the hood and thus very effective cooling results.

This embodiment, does have a drawback in that the area of the vanes is somewhat limited if the desired shape and type of air flow is to be obtained. In an application where this limitation is not acceptable, i.e., where the full rectangular cross-section of the vanes is needed and/or where the vanes must be extended out further from the end of the machine, vanes constructed according to the embodiment of FIG. 3 may be used. In this case, the vanes designated on FIG. 3 by the numbers 31A through 31F are of a rectangular shape. The hub 32 is formed in the same manner as the hub 11 of FIGS. 1 and 2 to provide an extension of the heat pipe on its inside. Similarly, the vanes will be enclosed within a hood which is shaped substantially as the vanes themselves. This will result in a hood which has a square corner and stagnation of the air can result reducing the heat transfer. That is, there will be a smaller throughput of air and the rotor 3 and the fins 24 of the stator will not obtain the required cooling. To avoid such a problem, a plurality of baffles shaped as trapezoids are installed between the vanes. As shown on FIG. 3, there is a baffle installed between each set of vanes 31A through F. Thus, between vanes 31A and 31B is a baffle 33A, between vanes 31B and 31C, a baffle 33B, between vanes 31C and 31D, a baffle 33C, between vanes 31D and 31E, a baffle 33D, and between vanes 31E, 31F, a baffle 33E, and between vanes 31F and 31A, a baffle 33F. These guides baffles insure that the air entering through the entrance opening 20 and the grill 19 is directed toward the cooling fins 24 on the stator and does not become stagnant in the corner of the ventilator hoods. Although in the illustrated embodiment the baffles 33 are shown between each two vanes, in most instances sufficient cooling will result if only a pair of baffles are installed diametrically opposed to each other. For example, only the baffles 33A and 33D would need be installed. In addition, the baffles nedd not extend over the entire width of the vanes 31. This arrangement will impart the required turbulance to the air to cause it to be directed out of the ventilator hood and over the cooling fins 24. When an improved flow of air, the air temperatures as it leaves the ventilator and is directed over the cooling fins 24 will be lower and can provide more effective cooling.

Thus an improved cooling apparatus for use with an electric machine in which a fan having a hollow section is mounted to the rotor shaft which is hollowed to form the remainder of the heat pipe and which further provides cooling of the stator has been shown. Although a specific embodiment has been illustrated and described, it will be obvious to those skilled in the art that various modifications may be made without departing from the spirit of the invention which is intended to be limited solely by the appended claims.

What is claimed is:

1. Apparatus for improved cooling in an electric machine in which the rotor shaft is hollow and contains a small amount of working fluid so that it acts as a heat pipe comprising:

a. a fan having a plurality of essentially rectangular radial vanes, said fan having a hub shaped to fit over the end of the hollow shaft and said fan inclusive its vanes and its hub being formed in a single piece of highly conductive material and said hub having a hollow portion of a diameter equal to that of the hollow shaft to form an extension of the heat pipe, whereby the working fluid will be evaporated in the shaft portion of the heat pipe and will travel to the fan portion of the heat pipe where it will be condensed with heat being removed by the conductive effect of said hub and vanes and the air flowing thereover due to rotation of the fan, b. at least two trapezoidal guide baffles between two different pairs of vanes of said fan; and c. a hood, having a shape matching that of the fan, enclosing said fan.

2. The invention according to claim 1 wherein said guide baffles are diametrically opposed.

3. The invention according to claim 1, wherein said fan has a threaded portion in its hub and is screwed onto the end of said hollow shaft.

* * * * *